United States Patent
Zhu et al.

(10) Patent No.: US 12,154,038 B2
(45) Date of Patent: Nov. 26, 2024

(54) PREDICTIVE RFM SEGMENTATION

(71) Applicant: Punchh Inc., San Mateo, CA (US)

(72) Inventors: Zhaoyan Zhu, Foster City, CA (US); Xin Heng, Millbrae, CA (US)

(73) Assignee: Punchh Inc., San Mateo, CA (US)

( * ) Notice: Subject to any disclaimer, the term of this patent is extended or adjusted under 35 U.S.C. 154(b) by 495 days.

(21) Appl. No.: 16/818,519

(22) Filed: Mar. 13, 2020

(65) Prior Publication Data

US 2020/0293923 A1    Sep. 17, 2020

Related U.S. Application Data

(60) Provisional application No. 62/818,628, filed on Mar. 14, 2019.

(51) Int. Cl.
*G06N 5/04*    (2023.01)
*G06F 16/24*    (2019.01)
(Continued)

(52) U.S. Cl.
CPC ............... *G06N 5/04* (2013.01); *G06F 16/24* (2019.01); *G06N 20/00* (2019.01); *G06Q 30/0204* (2013.01)

(58) Field of Classification Search
CPC .......... G06N 5/04; G06N 20/00; G06F 16/24; G06Q 30/0204
(Continued)

(56) References Cited

U.S. PATENT DOCUMENTS

2006/0143071 A1    6/2006  Hofmann
2013/0304910 A1*  11/2013  Hanlon ................. G06Q 10/06
                                                                   709/224
(Continued)

FOREIGN PATENT DOCUMENTS

WO    WO-00/42530 A1    7/2000

OTHER PUBLICATIONS

Amoy X. Yang "How to develop new approaches to RFM segmentation" Journal of Targeting, Measurement and Analysis for Marketing vol. 13, 1, 50-60 Henry Stewart Publications 1479-1862 (Year: 2004).*

(Continued)

*Primary Examiner* — Abdallah A El-Hage Hassan
(74) *Attorney, Agent, or Firm* — Foley Hoag LLP; Erik A. Huestis; Joshua S. Matloff (57) ABSTRACT

A system and a method are disclosed for adjusting communication settings based on user segmentation. An activity-based communication management system retrieves behavioral and demographic data of at least one user. The system inputs the behavioral data and the demographic data into machine learning models. For each of the machine learning models, the system receives a respective activity parameter characterizing a predicted activity occurring within a time window. The system determines, based on the received activity parameters, a category to which the behavioral data and demographic data belong. The system subsequently adjusts a plurality of communication settings based on the determined category. The activity-based communication management system may provide user segmentation using both empirical activity parameters (e.g., historical behavioral data) and predicted activity parameters.

19 Claims, 5 Drawing Sheets

(51) Int. Cl.
*G06N 20/00* (2019.01)
*G06Q 30/0204* (2023.01)

(58) Field of Classification Search
USPC .......................................................... 706/12
See application file for complete search history.

(56) References Cited

U.S. PATENT DOCUMENTS

| | | | | |
|---|---|---|---|---|
| 2014/0195544 | A1* | 7/2014 | Whitman | G06F 16/435 707/744 |
| 2015/0332296 | A1 | 11/2015 | Chu et al. | |
| 2016/0189210 | A1* | 6/2016 | Lacey | G06Q 10/067 705/7.31 |
| 2016/0247173 | A1* | 8/2016 | Manoharan | G06Q 30/0202 |

OTHER PUBLICATIONS

Cormac Dullaghan and Eleni Rozaki, "Integration of Machine Learning Techniques to Evaluate Dynamic Customer Segmentation Analysis for Mobile Customers" School of Computing, National College of Ireland, Dublin, Ireland (Year: 2017).*

Dullaghan, C. et al., "Integration of Machine Learning Techniques to Evaluate Dynamic Customer Segmentation Analysis for Mobile Customers," International Journal of Data Mining & Knowledge Management Process (IJDKP), vol. 7, No. 1, Jan. 2017, pp. 13-24.

PCT International Search Report and Written Opinion, PCT Application No. PCT/US2020/022685, dated Jun. 10, 2020, 22 pages.

Wollen, R. et al., "How to Incorporate RFM Segmentation with Predictive Models," Target Marketing, Jan. 7, 2009, pp. 1-6, [Online] [Retrieved on May 14, 2020] Retrieved from the Internet <URL: https://www.targetmarketingmag.com/article/how-incorporate-rfm-segmentation-with-predictive-models-401539/all/>.

Yang, A. X., "How to develop new approaches to RFM segmentation," Journal of Targeting, Measurement and Analysis for Marketing, vol. 13, No. 1, May 24, 2004, pp. 50-60.

APM Consulting Inc., "Excel Sales Data Analysis [Business Tech], " Shoeisha Co., Ltd., Feb. 15, 2015, p. 48.

Extended European Search Report for EP Application No. 20770697.9 dated Nov. 18, 2022.

* cited by examiner

PREDICTIVE RFM SEGMENTATION

CROSS REFERENCE TO RELATED APPLICATIONS

This application claims the benefit of U.S. Provisional Application No. 62/818,628, filed Mar. 14, 2019, which is incorporated by reference in its entirety.

TECHNICAL FIELD

The disclosure generally relates to machine learning, and more particularly, to segmenting information by applying profile data to machine learning models as input, and receiving segmentation information as output from the machine learning models.

BACKGROUND

User segmentation may be determined based on historical data of user activity. For example, recency, frequency, and monetary (RFM) analysis is used to group users into categories to identify users most likely to respond to communication from an enterprise and recommend future activities for the users. However, user segmentation based on RFM analysis is limited to data from the past. User segmentation currently does not account for a user's predicted activity. To improve the accuracy of predictions output by machine learning models, demographic data may be used in combination with other data types to train the machine learning models. However, the additional application of demographic data as an input into the machine learning models may be impacted by insufficient demographic data that may lead to inaccurate user segmentation and by a mismanaged abundance of demographic data that causes unnecessary processing during the use and retraining of machine learning models.

Furthermore, while existing product recommendation systems often operate using item-level information to predict a user's affinity to an item, a recommendation system does not output predictions on user activity (e.g., predicted resources a person may be willing to contribute to a task over the next year, or a time at which the user is likely to contribute those resources). Product recommendation systems require an itemized activity history of a user, which in turn, requires a large consumption of storage space on device or server memory and network bandwidth to transmit between devices and/or servers.

SUMMARY

Described herein are embodiments of systems and methods for determining a user segmentation and adjusting communication settings based on the segmentation. An activity-based communication management system may determine user segmentations based on both the user's behavioral data and demographic data. The user segmentations are determined using machine learning models that output predictive data characterizing users into segments. For example, machine learning models can be trained and retrained for outputting predictive RFM values to achieve user segmentation results that allow for improved user segmentation over conventional RFM analysis. This improvement may be achieved by the use of predictive RFM in place of or in addition to existing RFM analysis that relies on historical RFM values.

To improve the RFM value prediction output by machine learning models, demographic data and other types of data may be used in addition to behavioral data to train the machine learning models (e.g., supplemental weather, location, or market data). In some embodiments, the incorporation of additional data such as demographic data into the user segmentation increases the accuracy of user segmentation. Accounting for demographic data in user segmentation may in turn improve a relationship between a user and an enterprise by way of improving the communication between the more accurately segmented user and the enterprise. For example, the activity-based communication management system determines the content of communication based on a category to which the user's behavioral and demographic data belong.

The activity-based communication management system may augment a recommendation system by reducing the storage and bandwidth requirement for making a recommendation. As an example, in some embodiments, the system uses an abstracted activity history of a user, rather than an itemized history of user activities, to support a recommendation system. For example, the system uses "recreational activities on February 12 with a value of 75 dollars," rather than "ski rental on February 12 with a value of 35 dollars and ski pass on February 12 with a value of 40 dollars," to determine a recommendation for a recreational activity or activities with a value of approximately 75 dollars. A data structure occupying less storage and requiring less bandwidth to communicate may represent the abstracted activity history than needed for an itemized activity history, increasing the storage and communication bandwidth afforded by using the activity-based communication management system.

The activity-based communication management system may retrieve behavioral data and demographic data of at least one user from a profile database. For example, the system retrieves the age, gender, and previously observed RFM values. The system may input the behavioral data and the demographic data into machine learning models. For example, the system inputs the retrieved data into a first machine learning model trained to output predicted recency values, a second machine learning model trained to output predicted frequency values, and a third machine learning model trained to output predicted monetary values.

For each respective machine learning model, the system may receive, as an output from the respective machine learning model, a respective activity parameter. A predicted activity may include a potential interaction between a user and an enterprise (e.g., a user commissioning a service from an enterprise). For example, the system receives, as an output from the machine learning model configured to output a predicted frequency value, a frequency that characterizes a predicted frequency at which a user is likely to engage with an enterprise within the upcoming week. In some embodiments, the system determines, based on at least one activity parameter of the activity parameters received, a category to which the behavioral data and the demographic data belong. For example, the system determines, based on the received predicted frequency value, that the behavioral and demographic data of the user can be categorized into a high frequency user segment (e.g., users who engage relatively more often with an enterprise). The system may adjust communication settings based on the determined category. For example, the system adjusts the content of the communications transmitted to a user categorized into a high frequency user segment (e.g., includes more notifications of newly available items or services at the enterprise).

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a network diagram illustrating a communication environment in which an activity-based communication management system operates, in accordance with at least one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary Activity-based Communication Management System Architecture

Figure 1:
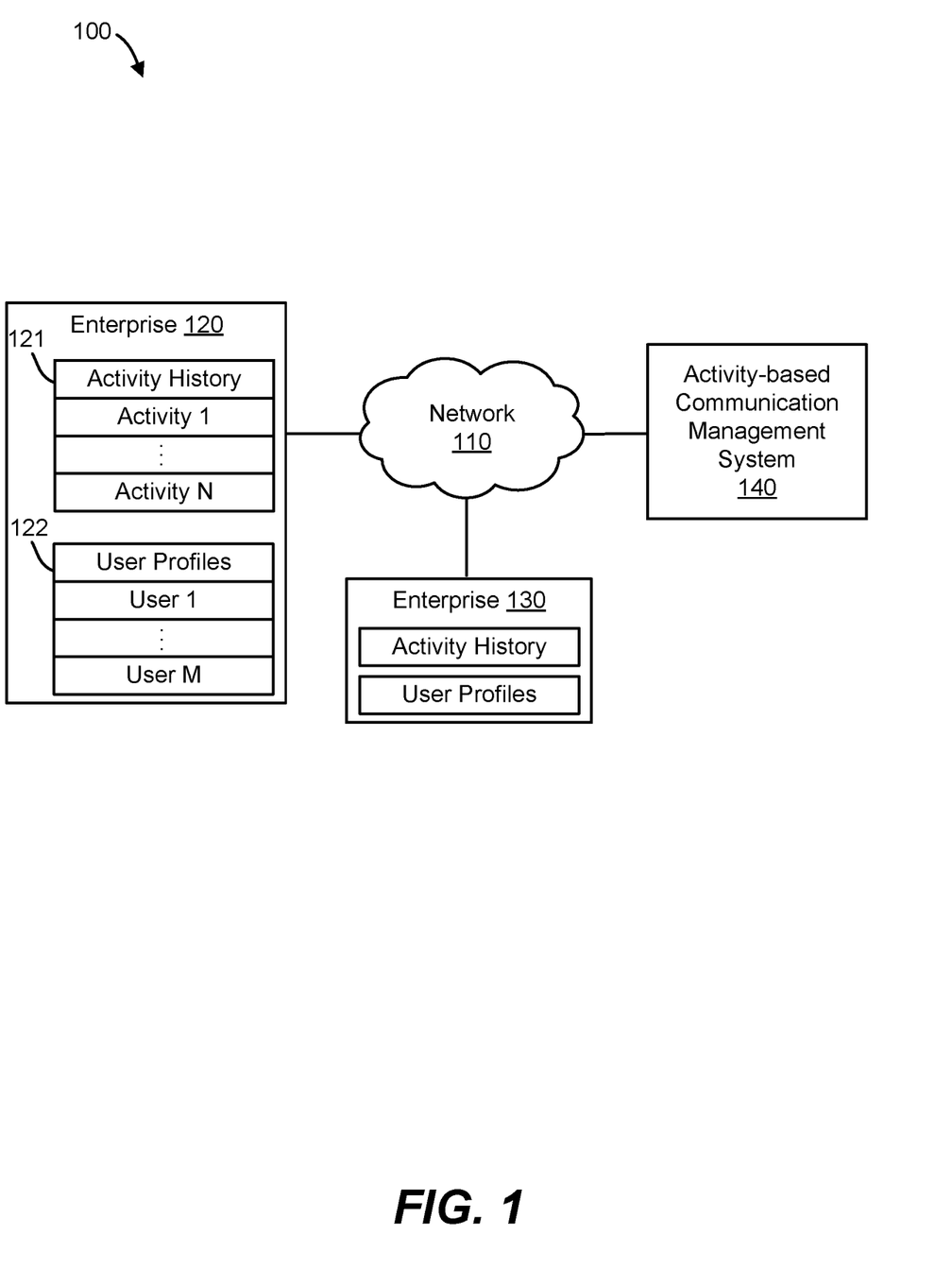

FIG. 1 is a network diagram illustrating communication environment 100 in which activity-based communication management system 140 operates. Communication environment 100 includes network 110, enterprises 120 and 130, and activity-based communication management system 140. In alternative configurations, different and/or additional components may be included in communication environment 100. For example, data such as activity history may be stored at enterprises 120 and 130 and/or stored at activity-based communication management system 140.

Network 110 is communicatively coupled with at least one enterprise (e.g., enterprise 120 and enterprise 130), and activity-based communication management system 140. In some embodiments, network 110 may be communicatively coupled between only one enterprise and activity-based communication management system 140. For example, network 110 communicatively couples enterprise 120 with activity-based communication management system 140 only. Network 110 may be one or more networks including the Internet, a cable network, a mobile phone network, a fiberoptic network, or any suitable type of communications network.

Enterprises 120 and 130 may be any enterprise including a retail business, department store, supermarket, Internet retailer, small business, restaurant, marketing firm, consulting firm, or any suitable enterprise associated with (e.g., selling, aggregating, monitoring, marketing, etc.) an inventory of products and/or services. In some embodiments, an enterprise is a collection of enterprises. For example, a national retailer has individual retail stores in across the nation and an online store. The terms "product" and "item," as used herein, refer to inventory of products and/or services offered by an enterprise to an enterprise user. As referred to herein, an "enterprise user" or "user" is an entity who engages with an enterprise in the exchange of products and/or services offered by the enterprise. Enterprises 120 and 130 may maintain a database of activity history and user profiles (e.g., activity history 121 and user profiles 122). The database may be local, remote, or a combination thereof. For example, recent activity history data may be stored at a local server (e.g., in a computer at the enterprise) and later transmitted to a remote server (e.g., for access by multiple enterprises).

In some embodiments, activity history 121 includes a list of activities performed, times activities were performed, types of activities performed, enterprise personnel interacted with during the activity, or any suitable record relevant to an activity performed. An enterprise may obtain activity history throughout normal operations with its users. For example, enterprise 120 stores a record of the number of user visits to enterprise 120 during the weeks between Thanksgiving and Christmas holidays.

In some embodiments, user profile 122 includes an age, a location of residence, a job title, a location of employment, or any suitable record relevant to demographic information. For example, enterprise 120 stores a record indicating that a user is a senior vice president at a technology company in San Francisco, Calif. In some embodiments, an enterprise obtains user profile 122 data directly from users and/or indirectly from a third party that is permitted to share user information with the enterprise. For example, a user creates a user account with an enterprise using a social media account, which causes the user profile data from the social media account to be stored as data in user profile 122. An enterprise may obtain user profile data directly from users visiting a brick and mortar location of the enterprise. For example, a user visiting a restaurant may provide his phone number to the restaurant when making a reservation.

Activity-based communication management system 140 may receive data from enterprises 120 and 130 through network 110. As referred to herein, a "system user" refers to an entity who interacts with activity-based communication management system 140. In some embodiments, activity-based communication management system 140 aggregates the received data for input to a machine learning model, the output of which is used to adjust communication settings used by enterprises 120 and 130. Activity-based communication management system 140 stores and maintains at least one database for user behavior and user demographic data and software modules that perform various operations such as generating an activity parameter indicative of a time window associated with an upcoming activity occurrence, categorizing the generated activity parameter, and adjusting communication settings based on the categories. An activity parameter, as referred to herein, may include a value characterizing a predicted activity occurring within a time window. Activity-based communication management system 140 is further described in the description of FIG. 2.

Although not shown in communication environment 100, a recommendation system may be coupled to activity-based communication management system 140. In some embodiments, system 140 provides user segmentation information to the recommendation system to generate or augment recommendations produced by the recommendation system. For example, system 140 provides the user segmentation to the recommendation system to produce a recommendation of a service commonly used by users categorized in a particular user segment.

Inventory Catalog Management System

Figure 2:
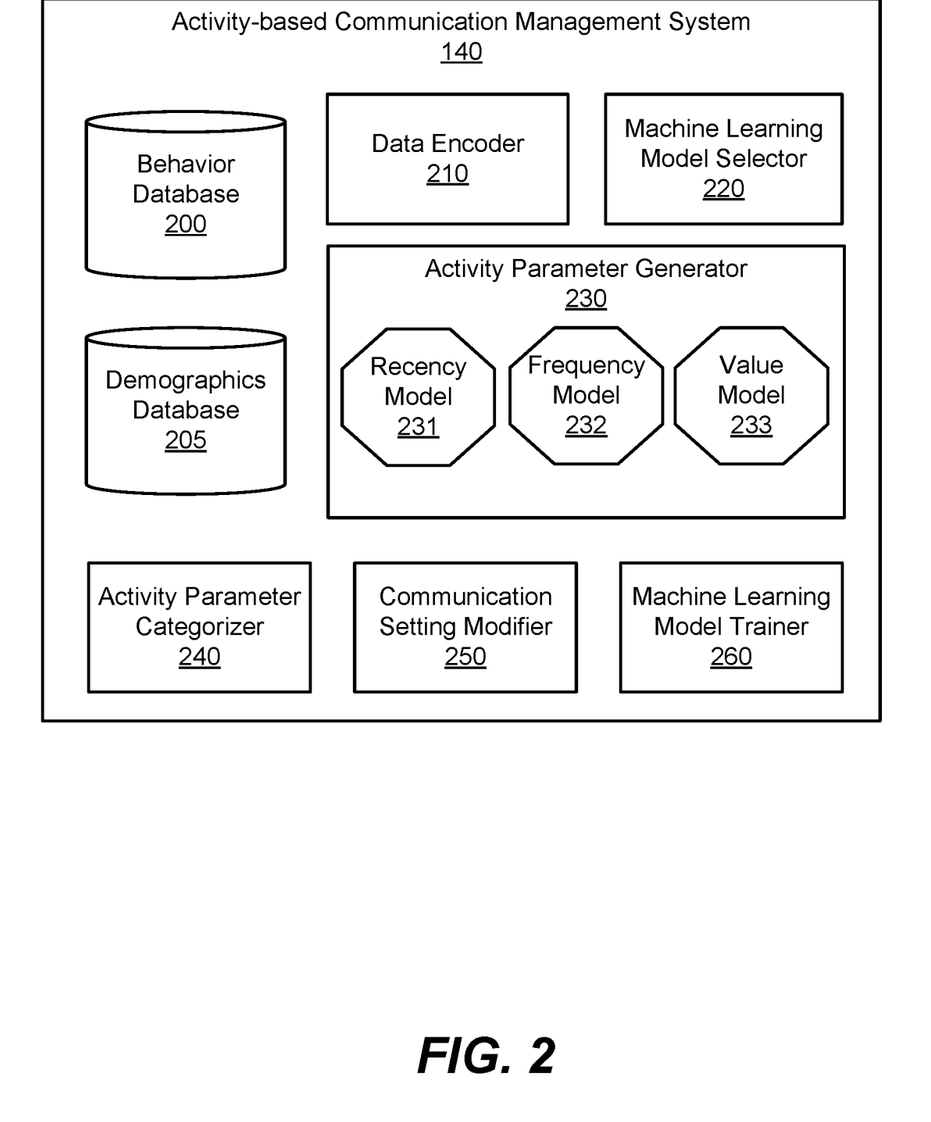
FIG. 2 is a block diagram of the activity-based communication management system of FIG. 1, in accordance with at least one embodiment.

FIG. 2 is a block diagram of activity-based communication management system 140 of FIG. 1. Activity-based communication management system 140, as shown in FIG. 2, includes multiple software modules: data encoder 210, machine learning model selector 220, activity parameter generator 230, activity parameter categorizer 240, communication setting modifier 250, and machine learning model trainer 260. Activity-based communication management system 140 may have access to local databases such as behavior database 200 and demographics database 205. In some embodiments, activity-based communication management system 140 includes additional, fewer, or different components for various functions. For example, behavior database 200 and/or demographics database 205 may be stored remotely and accessible through network 110. Although not depicted, behavior database 200 and demographics database 205 may be part of a larger profile database. As referred to herein, a profile database includes any collection of user data (e.g., behavioral and demographic data), enterprise data, and market data stored on a non-transitory, tangible computer readable storage medium. In some embodiments, enterprise data includes attributes describing the enterprise such as a location, an employee size, brand popularity, loyalty programs, and target user demographics. Market data may include financial economic indicators that represent the financial climate and in turn, the propensity of a user to interact with an enterprise. To promote clarity, references to behavioral and demographic data are made with respect to the actions of activity-based communication management system 140, but data such as enterprise and market data may also be used to determine user segmentation.

The stored data in behavior database 200 includes activity history of users associated with activity-based communication management system 140 (e.g., receiving communication from enterprises 120 and 130 managed by the system). The activity history may include historical information on a user, as well as information regarding the relationship between the user and an enterprise. For example, behavior database 200 includes a date on which the user first began receiving services from enterprise 120. Behavior database 200 may include activity promotional campaigns that users have previously interacted with. In some embodiments, behavior database 200 includes communication between users and an enterprise. For example, a user requests enterprise 120 to send email notifications regarding upcoming activity opportunities. Behavior database 200 may include data representative of a user's preferences such as activity preferences. Preferences may be provided to activity-based management system 140 based on data taken directly from the user (e.g., user fills in a form specifying his preference) or may be determined by activity-based management system 140 based on patterns of user behavior. For example, behavior database 200 includes data indicating that a user prefers to interact with enterprise 120 over another enterprise offering the same products or services because the user visited enterprise 120 more often in the last month than he visited the other enterprise. In another example, behavior database 200 includes data indicating that a user prefers to perform activities on weekends rather than weekdays. In some embodiments, behavior database 200 includes loyalty program data. For example, behavior database 200 includes a duration of time that a user has been enrolled in a loyalty program with enterprise 120.

Various types of data may be stored behavior database 200. For example, data may include transaction data, RFM data, promotional campaign data, user-enterprise communication data, or any suitable data relevant to a user's performance of an activity with an enterprise. RFM data stored in behavior database 200 may indicate activity parameters previously generated for a user (e.g., parameters representing recency of a user to perform an activity). In some embodiments, activity history stored and/or generated by enterprises are received by an activity-based communication management system over a network and stored at behavior database 200.

For example, activity history 121 may be received by activity-based communication management system 140 over network 110 and stored at behavior database 200.

The stored data in demographics database 205 includes user profile information of users associated with activity-based communication management system 140. The user profile information may include information on each of the individuals, such as biographic and demographic information. For example, user profile information includes data indicating that a user that has interacted with enterprise 120 is a 35-year old female residing in San Francisco, Calif. Various types of data may be stored in demographics database 205. For example, data may include geographic locations or coordinates, user device information, social media data, personally identifiable information (PII), or any other suitable data for identifying a user. In some embodiments, user profile data stored and/or generated by enterprises are received by an activity-based communication management system over a network and stored at demographics database 205. For example, user profile 122 may be received by activity-based communication management system 140 over network 110 and stored at demographics database 205.

Data Encoder 210 pre-processes data stored in databases 200 and 205 for input into machine learning models of activity parameter generator 230. In some embodiments, data encoder 210 generates feature vectors using data stored in databases 200 and 205. Data received by activity-based communication management system 140 may be from multiple enterprises that do not necessarily use the same terminology to label their data or data types. For example, while one enterprise labels the data type of a user's location with "address," another labels the user's location with "residence." Data encoder 210 may determine the similarity between two label terms based on the values associated with the labels. For example, data encoder 210 uses the address format of both "address" and "residence" labels to determine that the two label terms are similar and encodes the values similarly. In this way, activity-based communications system 140 may standardize data in databases 200 and 205 for input into activity parameter generator 230.

In some embodiments, data encoder 210 attributes weights within training sets or feature vectors input to a machine learning model. Weights may be determined by machine learning model trainer 260 and are discussed in further detail in the description of machine learning model trainer 260. In some embodiments, data encoder 210 filters a subset of data from databases 200 and 205 to be generated into a feature vector. For example, data encoder 210 encodes data that has been collected within the past year to improve the likelihood that outputs from the machine learning models reflect recent user behavior (e.g., reflecting the latest economic trends that impact a user's engagement with an enterprise).

Machine learning model selector 220 selects a machine learning model to input data to (e.g., data encoded from data encoder 210). In some embodiments, activity-based communication system 140 trains, uses, and re-trains multiple machine learning models, as discussed in more detail with reference to activity parameter generator 230 and machine learning model trainer 260. In some embodiments, machine learning model selector 220 uses the data available for input to determine which machine learning model to use. For example, machine learning model selector 220 selects frequency model 232 because filtered data from data encoder 210 may be used by frequency model 232 to produce a predicted frequency value but is not sufficient to be used by recency model 231 or value model 233. In another example, the system may select a recency model 231 and frequency model 232 because the information available (e.g., information that has not exceeded a threshold age and thus, has not expired) is most conducive to predicting recencies and frequencies. In some embodiments, machine learning model selector 220 makes a selection based on a request for a particular activity parameter. For example, machine learning model selector 220 selects recency model 231 to input data to because a system user has requested for a predicted recency value.

Activity parameter generator 230 determines activity parameters representative of predicted user interactions between a user and an enterprise. As referred to herein, an activity parameter may include a value characterizing a predicted activity occurring within a time window. Activity parameter generator 200 includes recency model 231, frequency model 232, and value model 233. Machine learning models used by activity parameter generator 200 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof. These models can be any suitable machine learning model including neural networks for either regression or classification, random forest classifiers or regression models, logistic regression for classification, or linear regression. Training of these models is discussed in more detail with respect to machine learning model trainer 260.

An upcoming user interaction or activity may be described by multiple activity parameters, including a predicted recency, predicted frequency, and a predicted value. As referred to herein, the values of predicted recency, predicted frequency, and predicted value include corresponding predictions of recency, frequency, and monetary values of RFM analysis. In some embodiments, a predicted recency, indicative of an amount of time until the next interaction between a user and an enterprise, represents an enterprise's ability to retain a user as a loyal or engaged visitor. For example, a high recency reflects a user's relatively large trust in the enterprise and willingness to engage in activities with the enterprise. Activity parameter generator 230 may determine the predicted recency using a machine learning model (e.g., recency model 231). In some embodiments, a predicted frequency represents a number of visits by a user to an enterprise over a time window. For example, a high frequency reflects a user's relatively large amount of visits to an enterprise over a time window. Activity parameter generator 230 may determine the predicted frequency using a machine learning model, (e.g., frequency model 232). In some embodiments, a predicted value represents an amount (e.g., of real world currency) that a user is willing to contribute to the enterprise to engage in an activity with the enterprise. For example, a high value reflects a user's relatively large contribution to engage in an activity with an enterprise. Activity generator 230 may determine the predicted value using a machine learning model, (e.g., value model 233). In some embodiments, models 231-233 may receive weighted inputs (e.g., weighted feature vectors) where the weights may be different for each model. For example, system 140 may use a larger weight for age data input to recency model 231 than for frequency model 232.

In some embodiments, activity parameters are indicative of a time window associated with at least one upcoming activity occurrence. For example, a predicted recency indicates that, over the next month, a user is likely to engage heavily with an enterprise due to an exclusive event held by the enterprise that the user is invited to. In another example, a predicted value indicates that, over the current week, a user is likely to contribute nothing to an enterprise, but over the following week, the user is likely to contribute $100 to the enterprise.

Recency model 231 receives behavioral data and demographic data as inputs and outputs a predicted recency. Recency may refer to an amount of time until the next interaction between a user and an enterprise. In some embodiments, the output of recency model 231 indicates likely user interactions between at least one user and an enterprise. For example, recency model 231 receives behavior data for two users (e.g., RFM data and preferred method of communicating with an enterprise) and demographic data for the two users (e.g., ages and genders) and outputs predicted recencies of 10 and 90 units of time (e.g., days) for the respective users. In some embodiments, recency value and a measure of engagement are inversely proportional to one another. For example, a smaller recency indicates a user is more engaged with an enterprise than a user with a larger recency with that enterprise.

In some embodiments, the output of recency model 231 is associated with a time window. For example, the predicted recency of 10 days may be the predicted level of engagement between the corresponding user and the enterprise within the next 90 days. Recency model 231 may determine, for the same user, a recency of 0 days within the next 5 days.

Frequency model 232 receives behavioral data and demographics data as inputs and outputs a predicted frequency. In some embodiments, the output of frequency model 232 indicates likely user interactions between at least one user and an enterprise. For example, frequency model 232 receives behavior data for two users (e.g., RFM data and preferred method of communicating with an enterprise) and demographic data for the two users (e.g., ages and genders) and outputs predicted frequencies of 3 interactions within the time window and 0 interactions within the time window for the respective users. In some embodiments, the output of frequency model 232 is associated with a time window. For example, the predicted frequency of 0 may be the predicted rate of visits the corresponding user makes to the enterprise within the next 90 days.

Value model 233 receives behavioral data and demographics data as inputs and outputs a predicted value. In some embodiments, the output of value model 233 indicates likely user interactions between at least one user and an enterprise. For example, value model 233 receives behavior data for two users (e.g., RFM data and preferred method of communicating with an enterprise) and demographic data for the two users (e.g., ages and genders) and outputs predicted values of $25.50 and $12.40 for the respective users. In some embodiments, the output of value model 233 is associated with a time window. For example, the predicted value of $25.50 may be the predicted value that the corresponding user is going to contribute to the enterprise within the next 90 days.

Activity parameter categorizer 240 receives activity parameters from activity parameter generator 230 and divides, or segments, users into groups based on the activity parameters associated with respective users. In some embodiments, groups produced by this segmentation are characterized by permutations of degrees of recency, frequency, and value. For example, a group used for categorization by activity parameter categorizer 240 is characterized by high recency, high frequency, and high value. Users categorized into this group may be engaged with an enterprise that they visit often and spend large amounts of money at. Another segment is characterized by low recency, high frequency, and high value. Users categorized into this group may be easily swayed to stop engaging with an enterprise despite visiting the enterprise often and spending large amounts of money at the enterprise. A segment may be characterized by high frequency and any degree of recency and/or value. Users categorized into this group may be very devoted to an enterprise because of the goodwill cultivated by the enterprise. A segment may be characterized by high value and any degree of recency and/or frequency. Users characterized into this group may spend large amounts of money with an enterprise. Additional user segmentation examples are shown in Table 1.

TABLE 1

Examples of Enterprise User Segmentation Permutations

| Predicted recency | Predicted frequency | Predicted value | User Segment |
|---|---|---|---|
| Low | Low | High | Recent high spending user |
| Low | High | High | Recent high and frequent spending user |
| High | Low | High | Rare high spending user |
| High | High | High | Enterprise champion |
| Any value | High | Any value | Loyal user |
| Any value | Any value | High | High spending user |
| Any value | High | Low | Loyal low spending user |
| Any value | Low | High | Rare high spending user |
| Average | High | High | Potential disengaged user |

In some embodiments, activity parameter categorizer 240 applies weights to the received activity parameters when categorizing the user into a group. For example, activity parameter categorizer 240 applies a weighted sum of the frequency and value parameters and uses the combined frequency-value parameter with the recency value to form an additional group for categorization. This may be applicable when there are numerous parameters to group a user with because the processing time and power may increase with the number of parameters processed by activity parameter categorizer 240. For example, activity parameter categorizer 240 may receive multiple parameters of each of the respective recency, frequency, and value types that account for different time windows such as 3 months in the past, 1 week in the past, 10 days in the future, and 2 months in the future. Using a weighted sum with certain parameters may reduce the dimensions of the mathematical calculation to be performed by activity parameter categorizer 240. Another weighting technique applicable to categorizing the received activity parameters is the analytic hierarchy process or AHP technique. The weights may be obtained from surveying experts or derived from user behavior data. The activity parameter categorizer 240 is not limited by a particular weighting scheme.

Activity parameter categorizer 240 may segment users into groups based on the difference of received activity parameters. For example, a user may be categorized into an enterprise champion based on the change of recency and frequency activity parameters over time. Activity parameter categorizer 240 may receive parameters corresponding to time windows that represent a number of windows in time (e.g., a window in the past and a window in the future) and use the difference of the received parameter values to determine that the differences reflect more frequent interactions with the enterprise.

Communication setting modifier 250 adjusts communication settings based on segmentation determined by activity parameter categorizer 240. As referred to herein, communication settings include adjustable settings for communication to enterprise users through a communication network (e.g., the Internet, a cellular network, or postal service). Communication includes e-mails, short message service (SMS), in-application notifications, fliers, telephone calls, VOIP, or any suitable medium for transmitting information to an enterprise user.

In some embodiments, communication setting modifier 250 receives user segmentation or groups from activity parameter categorizer 240 and determines communication settings based on the groups. For example, communication setting modifier 250 receives user groups indicating that one user is categorized into a user group characterized by low recency, high frequency, and high value and another user is categorized into a user group characterized by high recency, low frequency, and low value. Communication setting modifier 250 may then determine communication settings for the first user that includes notifying the user of upcoming activity opportunities (e.g., sending the user a catalog of inventory items to be stocked in the future) and settings for the second user that includes notifying the user to join a loyalty program to receive additional discounts when engaging in activities with the enterprise. In another example, communication setting modifier 250 receives user segmentation indicating that a user is in a group characterized by high recency and determines generate communication settings inviting the user to exclusive events hosted by the enterprise. In some embodiments, communication setting modifier 250 may determine communication settings using a mapping table that maps a user group to at least one communication setting (e.g., communicate daily) or communication setting instruction (e.g., decrease communication frequency by 50%). Activity-based communication management system 140 may store mapping tables for each enterprise and/or a group of enterprises. For example, one mapping table is applicable to all enterprises providing a healthcare service.

In some embodiments, communication setting modifier 250 receives updates to existing user groups from activity parameter categorizer 240 and modifies communication settings based on the updated groups. For example, communication setting modifier 250 receives an update to the user groups indicating that a user has changed from being characterized by low value to high value. Communication setting modifier 250 may then update communication settings from notifying the user of discounts to notifying the user of more expensive activity opportunities.

Machine learning model trainer 260 trains machine learning models used by activity parameter generator 230 (e.g., recency model 231, frequency model 232, and value model 233). The machine learning models may be initially trained on data representative of previous activities between users and enterprises (e.g., historical recency data). In some embodiments, machine learning model trainer 260 uses manually labeled data from user-enterprise activities and user profiles. For example, a dataset including a user's historical frequency of performing an activity, contributions made to perform each activity (e.g., money spent), age, and location of residence is labeled with an expected recency, frequency, and/or value. Each model may be retrained at a different rate to ensure that each model reflects the latest training set available for it.

Machine learning model trainer 260 may retrain machine learning models used by activity parameter generator 230. To perform the retraining, machine learning model trainer 260 may update a training set using empirical behavioral data and demographic data. For example, a training set is updated to account for the recent activity experience (e.g., behavioral data updated to have empirical value of $55). In some embodiments, activity-based communication management system 140 receives an indication that an activity has occurred. For example, activity-based communication management system 140 receives feedback from a user that their recent activity experience with a discounted activity was unpleasant. Activity-based communication management system 140 may receive an empirical activity parameter associated with the recent activity experience. For example, activity-based communication management system 140 receives transaction data indicating that the user spent $55 instead of the $12.40 predicted using value model 233. This may indicate that the user was incorrectly categorized into a group with low value and instead should be categorized into a group with high value, which may be accomplished by retraining value model 233.

In some embodiments, machine learning model trainer 260 labels the updated training set using the empirical activity parameter. For example, the empirical value of $55 in combination with user demographic data, such as gender, is labeled such that the predicted value output from value model 233 is a value that would be categorized as medium or high value (i.e., not categorized in a group with low value) by activity parameter categorizer 240. Machine learning model trainer 260 may use the labeled, updated training set to train a machine learning model used by activity parameter generator 230. For example, the labeled training set with the updated empirical value of $55 combined with previously used demographic data is used by machine learning model trainer 260 to train value model 233.

In some embodiments, machine learning model trainer 260 uses feedback to emphasize particular information from databases 200 and 205 that is likely to lead to correct or incorrect categorization that produces positive or negative feedback, respectively. For example, system 140 applies weights to particular attributes in the information from databases 200 and 205 (e.g., applying a greater weight to user age than applied to user's historical value contributed) and determines, after receiving positive feedback, that the weights have resulted in proper categorization.

Machine learning models used by activity parameter generator 230 may be trained independent of machine learning model trainer 260. For example, a machine learning model may iteratively retrain itself until the occurrence of a stopping condition, such as reaching a sufficient accuracy measurement calculation (e.g., the precision, recall, or F-score exceed respective threshold values) or completing a threshold number of training rounds.

Exemplary Communication Management User Interfaces

Figure 3:
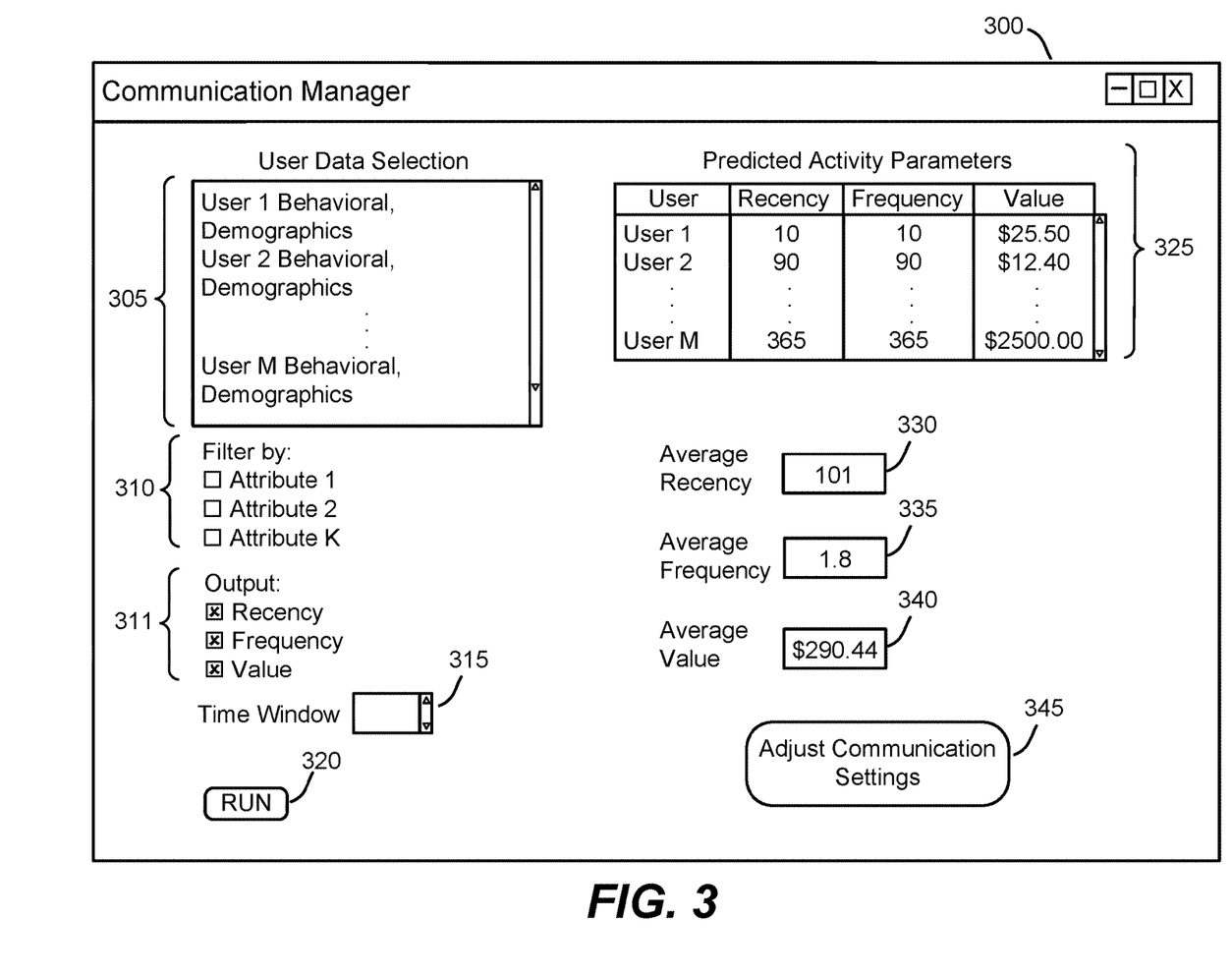
FIG. 3 depicts a graphical user interface (GUI) for managing communication using the activity-based communication management system of FIG. 1, in accordance with at least on embodiment.

FIG. 3 depicts graphical user interface (GUI) 300 for managing communication using activity-based communication management system 140 of FIG. 1. GUI 300 of FIG. 3 shows a menu for an enterprise to adjust communication settings using activity-based communication management system 140.

In some embodiments, GUI 300 includes inputs for a system user to select data from databases with user characterization information (e.g., behavior database 200 and/or demographics database 205). For example, user data selection panel 305 is a selectable list of user characterization information sorted by user. Activity-based communication management system 140 may organize data in databases 200 and 205 for display in user data selection panel 305. In some embodiments, the organization of data by activity-based communication management system 140 facilitates filtering by attributes of the data using filter selection options 310. Activity-based communication management system 140 may categorize data in databases 200 and 205 by attributes that describe groups of data. For example, attributes may include a gender, an age range, a recency range, a frequency range, a value range, any suitable descriptive attribute of a grouping of data, or a combination thereof. In some embodiments, a system user can specify the activity parameters to be predicted by activity parameter generator 230 through output selection options 311. For example, a user selects only "Recency" of output selection options 311 to limit activity parameter generator 230's to only using recency model 231. In some embodiments, a system user can specify a time window for analysis of predicted activity parameters (e.g., predicted RFM) using time window box 315. For example, a system user inputs a number, 90, of days into the future to be used for predicting RFM for users selected in user data selection panel 305. GUI 300 may include a prediction execution button 320 for requesting a report on predicted RFM based on the system user inputs through user data selection panel 305, filter selection options 310, output selection options 311, and time window box 315. Selection of prediction execution button 320 may transmit a request to activity-based communication management system 140 to determine predicted RFM. In some embodiments, activity-based communication management system 140 performs this determination by retrieving the selected data (e.g., from user data selection panel 305 and filtered by filter selection options 310) from behavior database 200 and/or demographics database 205. Activity-based communication management system 140 may subsequently input the retrieved data to at least one of models 231-233 of activity parameter generator 230. In some embodiments, activity-based communication management system 140 causes resulting outputs from at least one of models 231-233 to be displayed in GUI 300.

In some embodiments, GUI 300 includes outputs for a system user to view generated reports on predicted activity parameters (e.g., predicted RFM). For example, predicted activity parameter report panel 325 is a list of predicted RFM for each user specified in user data selection panel 305. In some embodiments, activity-based communication management system 140 calculates values that are representative of multiple values in the list of predicted activity parameters displayed in panel 325. For example, activity-based communication management system 140 calculates the average recency for all users selected and causes the value to be displayed in average recency box 330. Similarly, activity-based communication management system 140 calculates the average frequency and value for all users selected and causes the values to be displayed in average frequency box 335 and average value box 340, respectively. Selection of communication setting adjustment button 345 may transmit a request to activity-based communication management system 140 to adjust and/or generate communication settings for at least one of the selected users. Although not depicted, GUI 300 may include boxes displaying the respective differences in average recency, frequency, and value since the last time communication settings were adjusted. The system user may choose to select communication setting adjustment button 345 because the respective differences have changed substantially (e.g., the difference is greater than a threshold) since the last time communication settings were adjusted.

To adjust and/or generate communication settings for at least one of the selected users following the selection of communication setting adjustment button 345, in some embodiments, activity-based communication management system 140 determines categories to which the data selected through user data selection panel 305 belongs to. System 140 may determine these categories based on the predicted activity parameters as displayed in predicted activity parameter report panel 325. For example, activity-based communication management system 140 evaluates a user's predicted activity parameters, which indicate that the associated behavioral and demographic data belong to a user group characterized by high recency, high frequency, and high value. System 140 may then categorize the user into this user group and adjust communication settings based on the categorization. For example, system 140 modifies the existing communication settings of transmitting an email to the user once a week to transmitting an email to the user twice a week because increasing the frequency of communication is appropriate for an increase in predicted value and frequency determined by system 140 for the user.

Activity-based communication management system 140 may automatically perform activity parameter predictions and/or communication setting adjustments as achievable through GUI 300. In some embodiments, the activity parameter predictions and/or communication setting adjustments may be periodic, at pre-selected times, responsive to predetermined conditions, or a combination thereof. For example, activity-based communication management system 140 periodically determines predicted activity parameters weekly and adjusts communication settings responsive to the predicted activity parameters exceeding or falling below respective activity parameter thresholds (e.g., predicted frequency of 10 has fallen below frequency threshold of 20).

In some embodiments, activity-based communication management system 140, although not shown in FIG. 2, includes an activity recommender module to determine recommended activities based on activity parameters from generator 230 and/or user segmentation from categorizer 240. For example, the activity recommender module may determine a recommendation to the user to engage in an activity with an enterprise (e.g., recommend visiting a store to purchase an inventory item or items valued at similar amounts found in the activity history).

Computing Machine Architecture

Figure 4:
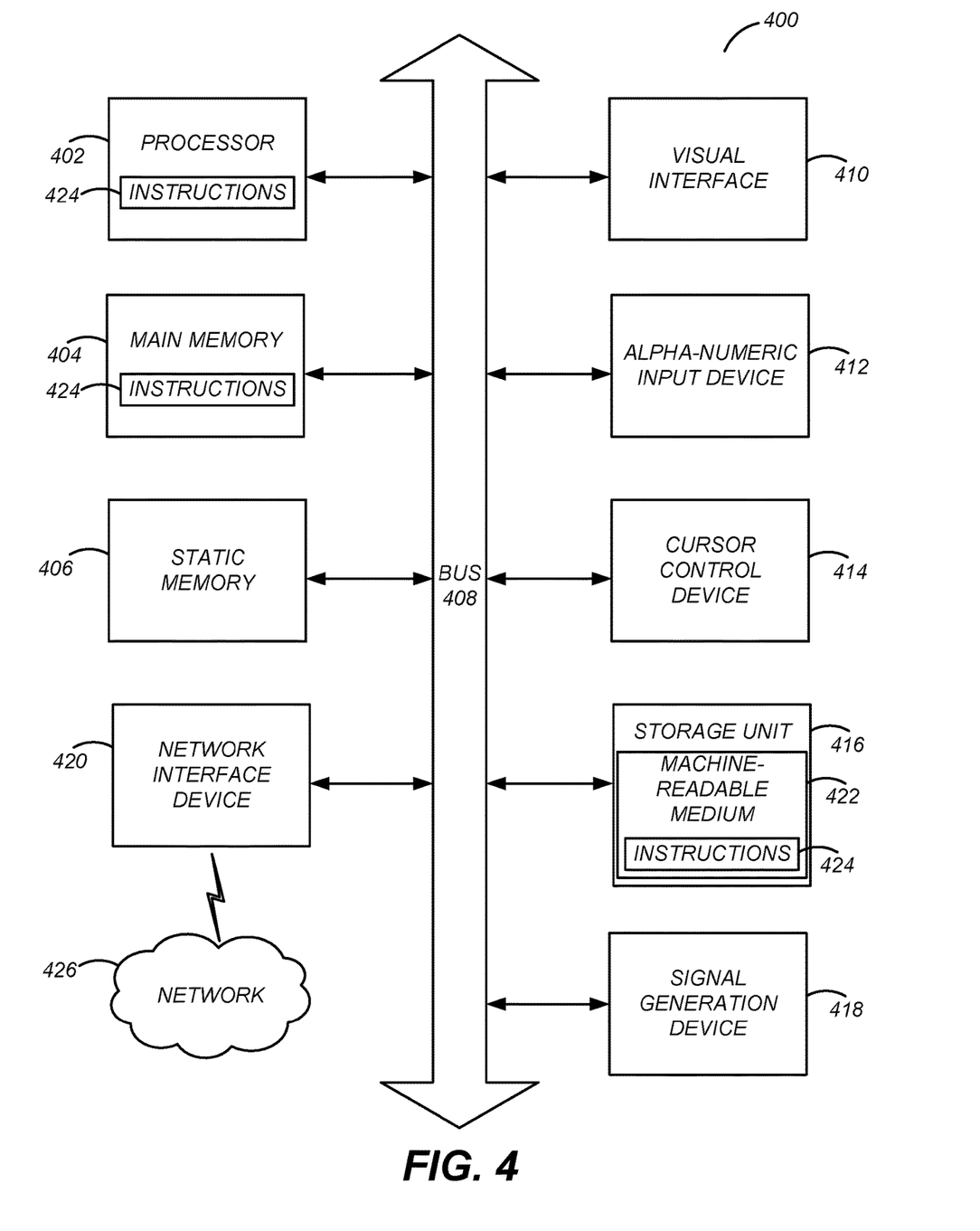
FIG. 4 shows a diagrammatic representation of a computer system for implementing the activity-based communication management system of FIG. 1, in accordance with at least one embodiment.

FIG. (FIG.) 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Processes for Modifying Communication Settings

Figure 5:
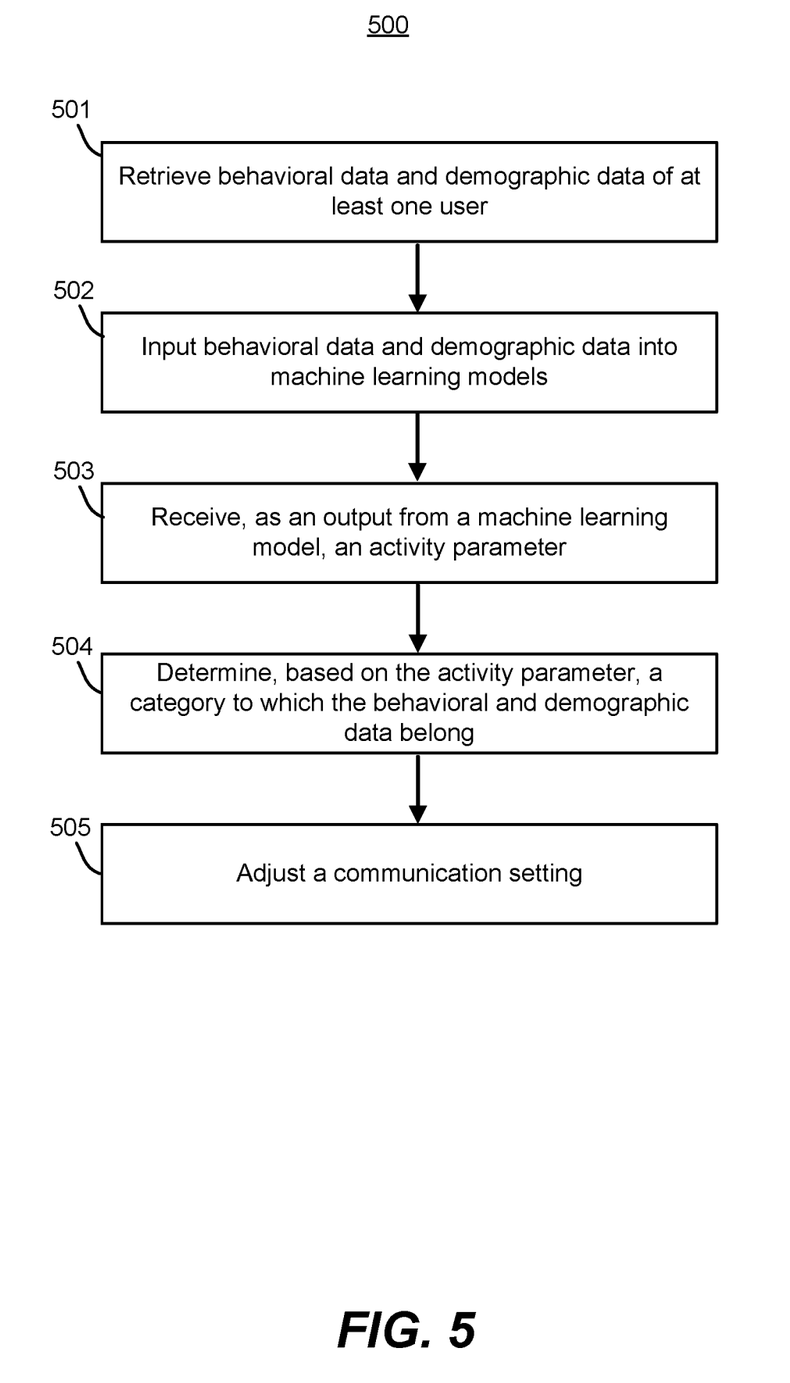
FIG. 5 is a flowchart illustrating a process for adjusting a communication setting using the activity-based communication management system of FIG. 1, in accordance with at least one embodiment.

FIG. 5 is a flowchart illustrating process 500 for adjusting a communication setting using activity-based communication management system 140 of FIG. 1. In some embodiments, activity-based communication management system 140 perform operations of process 500 in parallel, in different orders, or perform different steps. For example, although not depicted, process 500 may perform receiving 503 multiple times for each machine learning model or for each activity parameter output by a respective machine learning model before determining 504 a category based on received activity parameters.

Activity-based management system 140 retrieves 501 behavioral data and demographic data of at least one user. In some embodiments, system 140 retrieves behavioral data and demographic data from behavior database 200 and demographics database 205, respectively. For example, system 140 retrieves the age, gender, and historical RFM for a set of users whose data is recorded in database 200 and 205.

Activity-based management system 140 inputs 402 behavioral data and demographic data into machine learning models. In some embodiments, system 140 inputs data retrieved from databases 200 and 205 into at least one of recency model 231, frequency model 232, and value model 233. For example, system 140 inputs the age, gender, and historical RFM of users into frequency model 232.

Activity-based management system 140 receives 503, as an output from a machine learning model, an activity parameter. In some embodiments, system 140 receives predicted activity parameters from models 231-233. For example, system 140 receives a predicted frequency for the set of users whose data was input into frequency model 232.

Activity-based management system 140 determines 504 a category to which the behavioral data and demographic data belong based on at least one activity parameter received as an output from a machine learning model. In some embodiments, system 140 determines that the age, gender, and historical RFM of a user belongs to a user group characterized by high frequency because the received predicted frequency for the user was above a predetermined threshold.

Activity-based management system 140 adjusts 505 a communication setting. In some embodiments, system 140 adjusts a communication setting based on the category determined 504. For example, system 140 increases the frequency of emails transmitted to the user from an enterprise because the high frequency reflects a likelihood that emails will be well-received by the user.

Additional Configuration Considerations

Example benefits and advantages of the disclosed configurations include improved accuracy for user segmentation using demographic data in combination with behavioral data (e.g., historical RFM) as inputs to at least one machine learning model. The system may standardize demographic data sourced from different databases (e.g., different enterprises within the same industry). Standardizing demographic data for input into machine learning models increases the amount of demographic data interpretable by a model as referring to the same type of data (e.g., standardizing user addresses that were formatted or labeled differently across different databases). An increase in interpretable data improves both initial training and retraining of a machine learning model, causing the model to produce more accurate results. In some embodiments, multiple machine learning models may be used to output user segmentation information (e.g., activity parameters). Using multiple machine learning models allows for selective use of models depending on the desired user segmentation information, thereby reducing unnecessary processing cycles. Additionally, multiple machine learning models allows the system to output up-to-date user segmentation information with recent demographic and behavioral data used for the input into machine learning models. Each model may rely on different information for its input and one model may be run more frequently than another if its input information is updated more frequently. Accounting for user demographics increases an accuracy of user segmentation that, in turn, allows the system to properly adjust communication settings for users.

The activity-based communication management system may pre-process demographic data for input to machine learning models to improve the quantity and/or quality of demographic data used to achieve these benefits. In some embodiments, the system encodes demographic data provided by various sources such that the demographic data is standardized for input into a machine learning model. Accordingly, the quantity of demographic data available for user segmentation may increase due to the encoding and standardization of data. In some embodiments, the system determines a subset of demographic data to be used (e.g., filtering the demographic data) or weighted differently for a particular machine learning model. For example, the system uses empirical values of the predicted values and/or feedback to determine that re-training a machine learning model with data related to user's location increases the accuracy of particular segmentation information that is output. Accordingly, the quality of demographic data input to the machine learning models may increase due to the filtering and weighting of data. Pre-processing demographic improves the amount and quality of training sets of demographic and/or behavioral data available for input to the machine learning models that output segmentation information. In particular, standardizing demographic data obtained from multiple enterprises may increase the number and/or efficacy of training sets by encoding information of a single data type similarly despite potential labeling differences. For example, although one enterprise may label an address of residence data type as "residence" while another enterprise labels the data type as "address," the system may determine that the two data values refer to the same data type and encode the values similarly. In this way, two training sets having the respective address of residence data types are properly identified as such and used within the same training set (e.g., for input to a recency model that uses address of residence to predict a recency) rather than one being omitted due to improper data type identification.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining predicted activity parameters for adjusting communication settings through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   retrieving, from a first profile database, behavioral data and demographic data of at least one user;
   retrieving, from a second profile database, demographic data for the at least one user;
   encoding the demographic data from the first profile database and the demographic data from the second profile database into a feature vector representing demographic data from the first and the second profile database;
   inputting the behavioral data and the feature vector representing demographic data from the first and the second profile database into a plurality of machine learning models, each of the plurality of machine learning models being trained to determine a predicted activity occurring within a time window;
   for each respective machine learning model of the plurality of machine learning models:
      receiving, as an output from the respective machine learning model, a respective activity parameter characterizing a respective predicted activity occurring within a respective time window;
   determining, based on a plurality of activity parameters of the received respective activity parameters, a category to which the behavioral data and the demographic data belong; and
   adjusting a plurality of communication settings of an electronic communication management system based on the determined category, thereby causing the electronic communication management system to transmit content of the communications to the at least one user based on the adjusted settings.

2. The method of claim 1, further comprising generating a data structure from the behavioral data and the feature vector representing demographic data from the first and the second profile database, wherein inputting the behavioral data and the feature vector representing demographic data from the first and the second profile database into the plurality of machine learning models comprises inputting the data structure into the plurality of machine learning models.

3. The method of claim 1, further comprising:
   determining that an activity has occurred;
   receiving an empirical activity parameter characterizing the activity that has occurred;
   updating a training set using the behavioral data and the demographic data;
   labeling the updated training set using the empirical activity parameter; and
   training a machine learning model of the plurality of machine learning models using the labeled training set.

4. The method of claim 1, wherein the plurality of machine learning models comprises a recency model, a frequency model, and a value model.

5. The method of claim 4, wherein the respective activity parameter for the recency model is a predicted recency, the predicted recency occurring within the time window.

6. The method of claim 5, wherein determining, based on the predicted recency, the category to which the behavioral data and the demographic data belong comprises:
   determining that the predicted recency is indicative of high recency; and
   determining that the behavioral data and the demographic data belong to a user group characterized by the high recency.

7. The method of claim 4, wherein the respective activity parameter for the frequency model is a predicted frequency, the predicted frequency occurring within the time window.

8. The method of claim 7, wherein determining, based on the predicted frequency, a category to which the behavioral data and the demographic data belong comprises:
- determining that the predicted frequency is indicative of high frequency; and
- determining that the behavioral data and the demographic data belong to a user group characterized by the high frequency.

9. The method of claim 8, wherein adjusting the plurality of communication settings comprises determining an activity opportunity to be communicated to the at least one user.

10. The method of claim 4, wherein the respective activity parameter for the value model is a predicted value, the predicted value occurring within the time window.

11. The method of claim 10, wherein determining, the category to which the behavioral data and the demographic data belong comprises:
- determining that the predicted value is indicative of high value; and
- determining that the behavioral data and the demographic data belong to a user group characterized by the high value.

12. The method of claim 11, wherein adjusting the plurality of communication settings comprises:
- increasing a threshold activity demand; and
- selecting an item to communicate to the at least one user, wherein the activity demand for the item exceeds the threshold activity demand.

13. A system comprising:
- a processor; and
- a non-transitory computer readable storage medium, the non-transitory computer readable storage medium having program instructions embodied therewith, the program instructions executable by the processor to cause the processor to perform a method comprising:
  - retrieve, from a first profile database, behavioral data and demographic data of at least one user;
  - retrieving, from a second profile database, demographic data for the at least one user;
  - encoding the demographic data from the first profile database and the demographic data from the second profile database into a feature vector representing demographic data from the first and the second profile database;
  - input the behavioral data and the feature vector representing demographic data from the first and the second profile database into a plurality of machine learning models, each of the plurality of machine learning models trained to determine a predicted activity occurring within a time window;
  - for each respective machine learning model of the plurality of machine learning models:
    - receive, as an output from the respective machine learning model, a respective activity parameter characterizing a respective predicted activity occurring within a respective time window; and
    - determine, based on a plurality of activity parameters of the received respective activity parameters, a category to which the behavioral data and the demographic data belong; and
  - adjust a plurality of communication settings of an electronic communication management system based on the determined category, thereby causing the electronic communication management system to transmit content of the communications to the at least one user based on the adjusted settings.

14. The system of claim 13, wherein the program instructions further cause the processor to: to generate a data structure from the behavioral data and the feature vector representing demographic data from the first and the second profile database, and wherein the activity parameter is configured to input the behavioral data and the feature vector representing demographic data from the first and the second profile database into the plurality of machine learning models by inputting the data structure into the plurality of machine learning models.

15. The system of claim 13, wherein the program instructions further cause the processor to:
- determine that an activity has occurred;
- receive an empirical activity characterizing the activity that has occurred;
- updating a training set using the behavioral data and the demographic data;
- label the updated training set using the empirical activity parameter; and
- train a machine learning model of the plurality of machine learning models using the labeled training set.

16. The system of claim 13, wherein the plurality of machine learning models comprises at least a recency model, a frequency model, or a value model.

17. A non-transitory computer readable storage medium storing executable instructions that, when executed by one or more processors, cause the one or more processors to perform operations comprising:
- retrieving, from a first profile database, behavioral data and demographic data of at least one user;
- retrieving, from a second profile database, demographic data for the at least one user;
- encoding the demographic data from the first profile database and the demographic data from the second profile database into a feature vector representing demographic data from the first and the second profile database;
- inputting the behavioral data and the feature vector representing demographic data from the first and the second profile database into a plurality of machine learning models, each of the plurality of machine learning models trained to determine a predicted activity occurring within a time window;
- for each respective machine learning model of the plurality of machine learning models:
  - receiving, as an output from the respective machine learning model, a respective activity parameter characterizing a respective predicted activity occurring within a respective time window;
  - determining, based on a plurality of activity parameters of the received respective activity parameters, a category to which the behavioral data and the demographic data belong; and
- adjusting a plurality of communication settings of an electronic communication management system based on the determined category, thereby causing the electronic communication management system to transmit content of the communications to the at least one user based on the adjusted settings.

18. The non-transitory computer readable storage medium of claim 17, wherein the operations further comprise:
- determining that an activity has occurred;
- receiving an empirical activity parameter characterizing the activity that has occurred;
- updating a training set using the behavioral data and the demographic data;

labeling the updated training set using the empirical activity parameter; and training a machine learning model of the plurality of machine learning models using the labeled training set.

19. The non-transitory computer readable storage medium of claim 17, wherein the plurality of machine learning models comprises at least a recency model, a frequency model, or a value model.

* * * * *